(12) United States Patent
AbiEzzi et al.

(10) Patent No.: US 10,693,935 B2
(45) Date of Patent: *Jun. 23, 2020

(54) USER INTERFACE REMOTING THROUGH VIDEO ENCODING TECHNIQUES

(71) Applicant: VMware, Inc., Palo Alto, CA (US)

(72) Inventors: Salim AbiEzzi, Sammamish, WA (US); Keith Whitwell, London (GB)

(73) Assignee: VMware, Inc., Palo Alto, CA (US)

( * ) Notice: Subject to any disclaimer, the term of this patent is extended or adjusted under 35 U.S.C. 154(b) by 711 days.

This patent is subject to a terminal disclaimer.

(21) Appl. No.: 15/056,998

(22) Filed: Feb. 29, 2016

(65) Prior Publication Data

US 2016/0182595 A1 Jun. 23, 2016

Related U.S. Application Data

(63) Continuation of application No. 13/561,768, filed on Jul. 30, 2012, now Pat. No. 9,277,237.

(51) Int. Cl.
*H04N 19/70* (2014.01)
*H04L 29/06* (2006.01)
(Continued)

(52) U.S. Cl.
CPC .......... *H04L 65/607* (2013.01); *G06F 3/0485* (2013.01); *H04L 67/42* (2013.01);
(Continued)

(58) Field of Classification Search
CPC ....... H04L 65/607; H04L 67/42; H04L 69/04; G06F 3/0485; H04N 19/162; H04N 19/51; H04N 19/543; H04N 19/70
See application file for complete search history.

(56) References Cited

U.S. PATENT DOCUMENTS 6,343,313 B1   1/2002   Salesky et al.
7,194,033 B2   3/2007   Yourlo
(Continued)

FOREIGN PATENT DOCUMENTS

EP   0669765 A2   8/1995
EP   2403249 A1   4/2012
(Continued)

OTHER PUBLICATIONS

International Searching Authority, International Application No. PCT/US2013/051894, Notification of Transmittal of the International Search Report and the Written Opinion of the International Searching Authority, or the Declaration, International Search Report and Written Opinion of the International Searching Authority dated Oct. 18, 2013.

(Continued)

*Primary Examiner* — Jennifer N To
*Assistant Examiner* — Amy P Hoang (57) ABSTRACT

Methods, techniques, and systems for user interface remoting using video streaming techniques are provided. Example embodiments provide User Interface Remoting and Optimization System ("UIROS"), which enables the efficient remoting of pixel-oriented user interfaces on behalf of their guests using generic video streaming techniques, such as H.264, to send compressed user interface image information in the form of video frame encoded bitstreams. In one embodiment, the UIROS comprises server side support including a UI remoting server, a video encoder, and rendering support and client side support including a UI remoting client, a video decoder, and a display. These components cooperate to implement optimized UI remoting that is bandwidth efficient, low latency and CPU efficient.

20 Claims, 9 Drawing Sheets

(51) Int. Cl.
*H04N 19/51* (2014.01)
*H04N 19/162* (2014.01)
*H04N 19/543* (2014.01)
*G06F 3/0485* (2013.01)

(52) U.S. Cl.
CPC .......... *H04L 69/04* (2013.01); *H04N 19/162* (2014.11); *H04N 19/51* (2014.11); *H04N 19/543* (2014.11); *H04N 19/70* (2014.11)

(56) References Cited

U.S. PATENT DOCUMENTS

| | | | |
|---|---|---|---|
| 7,222,306 B2 | 5/2007 | Kaasila et al. | |
| 8,121,423 B2 | 2/2012 | McDowell | |
| 2004/0151390 A1 | 8/2004 | Iwamura | |
| 2009/0063935 A1 | 3/2009 | Singh | |
| 2009/0080523 A1* | 3/2009 | McDowell | H04N 19/51 375/240.15 |
| 2009/0262868 A1 | 10/2009 | Mohammed et al. | |
| 2010/0271379 A1* | 10/2010 | Byford | G09G 5/001 345/545 |
| 2011/0090311 A1 | 4/2011 | Fang et al. | |
| 2011/0200107 A1 | 8/2011 | Ryu | |
| 2011/0289458 A1* | 11/2011 | Yu | H04N 7/17318 715/841 |
| 2012/0099594 A1 | 4/2012 | Lau et al. | |
| 2012/0133675 A1 | 5/2012 | McDowell | |
| 2012/0204171 A1 | 8/2012 | Reisman | |
| 2012/0317236 A1* | 12/2012 | Abdo | H04L 67/02 709/219 |
| 2013/0051478 A1 | 2/2013 | Wu | |
| 2013/0083840 A1 | 4/2013 | Heng et al. | |
| 2013/0107938 A9* | 5/2013 | Fogg | H04N 19/56 375/240.1 |
| 2013/0117662 A1* | 5/2013 | Shan | G09G 5/34 715/243 |

FOREIGN PATENT DOCUMENTS

| | | |
|---|---|---|
| WO | 9900978 A1 | 1/1999 |
| WO | 0137564 A1 | 5/2001 |

OTHER PUBLICATIONS

International Searching Authority, International Application No. PCT/US2013/051896, Notification of Transmittal of the International Search Report and the Written Opinion of the International Searching Authority, or the Declaration, International Search Report and Written Opinion of the International Searching Authority dated Oct. 17, 2013.

Iain Richardson, White Paper: An Overview of H.264 Advanced Video Coding, Vcodex / OneCodec, 2007-2011, 7 pages.

Iain Richardson, White Paper: A Technical Introduction to H.264 / AVC, Vcodex, 2002-2011, 4 pages.

Wikipedia, H.264/MPEG-4 AVC, http://en.wikipedia.org/wiki/H.264, downloaded Apr. 6, 2012, 16 pages.

Wikipedia, Inter Frame, http://en.wikipedia.org/wiki/Inter_frame, downloaded Apr. 6, 2012, 7 pages.

Wikipedia, Reference Frame (Vide), http://en.wikipedia.org/wiki/Reference_fram_(video), downloaded Jun. 27, 2012, 2 pages.

Teradici Corporation, PCoIP Technology Explained; http://www.teradici.com/pcoip/pcoip-technololgy.php, downloaded Apr. 14, 2012, 2 pages.

Google Scholar, update interface reuse pixel, downloaded Nov. 14, 2014, 2 pages.

Google Scholar, remote interface reuse pixel, downloaded Feb. 27, 2015, 2 pages.

Google Scholar, motion estimation video encoder, downloaded Oct. 26, 2015, 2 pages.

European Patent Office, EPO Application No. 13747553.9-1208, Communication pursuant to Article 94(3) EPC, dated Aug. 6, 2019.

* cited by examiner

Example Scrolling Operation

USER INTERFACE REMOTING THROUGH VIDEO ENCODING TECHNIQUES

CLAIM OF PRIORITY

This application is a continuation of U.S. patent application Ser. No. 13/561,768 filed on Jul. 30, 2012 and entitled "USER INTERFACE REMOTING THROUGH VIDEO ENCODING TECHNIQUES", by inventors Salim AbiEzzi and Keith Whitwell, issued as U.S. Pat. No. 9,277,237, which is incorporated by reference herein in its entirety.

TECHNICAL FIELD

The present disclosure relates to methods, techniques, and systems for user interface remoting and, in particular, to methods, techniques, and systems for efficient remoting of interactive user interfaces using video streaming and/or video encoding technologies.

BACKGROUND

The computing industry is evolving to a model of computing where the bulk of storage and computing occur at a datacenter or in the "cloud" (e.g., networked, Internet-accessible storage) and rich user experiences can be remoted to the user's location, using client devices of many different form factors. Significant advancements in virtualization infrastructure, networking infrastructure, as well as the diversity and proliferation of highly capable and portable client devices, have made such remote access highly viable and desirable. For example, it is not uncommon for employees, especially of large organizations, to work remotely and still desire and/or require use of their desktops and applications at their home offices. This has become possible through virtualization technology that allows a user's desktop and applications to be run in a datacenter while the actual user interface (the input/output—"I/O"—to the desktop and applications) is mimicked on a remote client device. Mimicking of the user interface is accomplished by "remoting" the user interface—that is directing (e.g., sending, forwarding, transmitting, communicating, or the like) screen output to the remote device (for example, to a display associated with the client device) and receiving input device data from the remote device (for example, through keyboard, mouse, touch, or other device input). The entire desktop (for example, the user interface of an operating system running on a host computing system or virtualization server) or a single application running on the desktop may be remoted on devices such as smart phones, tablets, notebook personal computers (PCs), desktop PCs, smart TVs, other form-factor computing devices, and the like.

Some challenges, including the latency of data arriving to and from such client devices, which impact the user experience, remain. Latency may be a result of limitations of the client devices and/or the networks connecting the client devices to the servers where the desktops and/or applications are running (or hosted). In addition, some networks and/or client devices have bandwidth limitations that can make it difficult to present a rich user interface experience in a responsive way. The more data that needs to be transferred quickly to a client device, the more likely latency and bandwidth limitations are encountered.

DETAILED DESCRIPTION

Embodiments described herein provide enhanced computer- and network-based methods, techniques, and systems for user interface remoting using video streaming techniques. As used herein, the phrase, "user interface remoting" refers to either remoting an entire desktop and/or an application user interface unless noted otherwise. Example embodiments provide a User Interface Remoting and Optimization System ("UIROS"), which enables virtualization environments to efficiently remote user interfaces on behalf of their guests (guest operating systems and/or guest applications) using generic video streaming techniques, such as the well-known H.264 video encoding standard, to send compressed user interface image information in the form of video frame encoded bitstreams. A generic video stream technique (e.g., format, codec, or the like) refers broadly to one not specifically optimized or designed for user interface remoting and thus may include formats that can be decoded, for example, by off-the-shelf, proprietary, standardized, or other video decoders (e.g., generic video decoders). This enables a client device with a generic (often hardware or embedded) video decoder to perform user interface (UI) remoting without being specifically or specially programmed to do so.

The UIROS exploits user interface semantics to take advantage of the high "frame" coherency that user interfaces commonly exhibit. That is, for many user interface operations, only a small portion of pixels change between consecutive frames (frames as defined by the video streaming protocol used). Commonly, for example in user activities such as scrolling, window moves, uncovering regions, and the like, a set of pixels which have already been transferred to a client device are re-positioned (e.g., moved to a new location) in the target frame, but not changed otherwise. This allows client devices to cache and reuse pixel information on the client side receiving only information relating to how the pixel information has moved in the target frame and any new information that needs to be rendered. Example embodiments of the UIROS advantageously send only these updates as video frame encoded bitstreams, so that client devices receive more compact and faster updates thereby increasing the overall efficiency of remoting user interfaces and thus decreasing UI latency. Client devices may include any type of device that supports the video streaming protocol employed, such as for example smart phones, tablets, notebook computers, desktop computers, smart televisions (TVs), and the like.

In addition, by using generic video streaming protocols, such as H.264 (otherwise known as Advanced Video Coding), H.265, Microsoft's VC-1, or Google's VP8, the UIROS can exchange optimized user interface remoting data with client devices without need for a specialized, potentially high cost, proprietary device driver or specialized hardware installed on the client. This is because many client devices are shipped already with hardware accelerators that support video decoding using these standards, and most popular web browsers (such as Internet Explorer, Google, and Chrome) are now configured (or in the near future will be configured) to use HTML 5, which supports a <video> tag for providing a standard network protocol for transmitting a video stream, such as H.264 over TCP/IP, which may be passed through to a resident hardware accelerated decoder, if available. The H.264 standard, described further below, defines the syntax of an encoded video bitstream in addition to the techniques for decoding the bitstream. Although described with reference to H.264, it is to be understood that the techniques, methods, and systems described herein also will operate with any other generic video standard, and that H.264, VC1, and VP8 are simply examples thereof. Note that the techniques, methods, and systems described herein will operate with proprietary as well as standardized or public video formats (for example, those approved by a standardization organization or publicly available); however, one of the desired outcomes of these techniques is to operate with standard web browsers executing on unmodified client devices that include generic video decoders in order to make optimized user interface remoting viable for everyone on all sorts of client devices. Using a generic protocol and directing updates to a web browser (or the native video driver) that provides built-in support for video streaming in client devices eliminates a need to create specialized client devices with specialty device support for UI remoting.

In typical video streaming, different techniques, including exhaustive searching, are used to determine motion estimation—to determine how pixels change from frame to frame. Motion estimation is the process of finding similar blocks of pixels (of a defined size, for example 16×16 or 4×4) to a target block of pixels. Similarity is defined in different ways by different algorithms. If a similar block of pixels is found, then only movement and/or difference data needs to be transmitted (e.g., communicated, forwarded, sent, or the like) and a reference to the similar block of pixels instead of all of the pixels. Exhaustive searching techniques for determining motion estimation are CPU intensive and sometimes prohibitive.

As described in detail below, using video streaming techniques for UI remoting presents opportunities for optimization that do not use such exhaustive searching techniques. Because of the frame coherency of many user interface activities, the UIROS can more easily locate similar frames during the motion estimation process. For example, the UIROS may determine pixel reusability by examining one or more of the following: the frame buffer used by the guest in addition to analyzing user input device movement, the graphics commands sent by the guest to the virtualization support code (such as the virtualization logic, or a component thereof) or to the host computing system, and commands invoked by a guest application using an applications programming interface ("API") directed to this purpose as described further below. This examination process may provide a "fingerprint" of activities that result in or should result in reusable blocks. The UIROS may also analyze feedback information about client load and network conditions to adjust (e.g., calibrate, tune, etc.) the timing and/or content of the video encodings and streaming.

Figure 1:
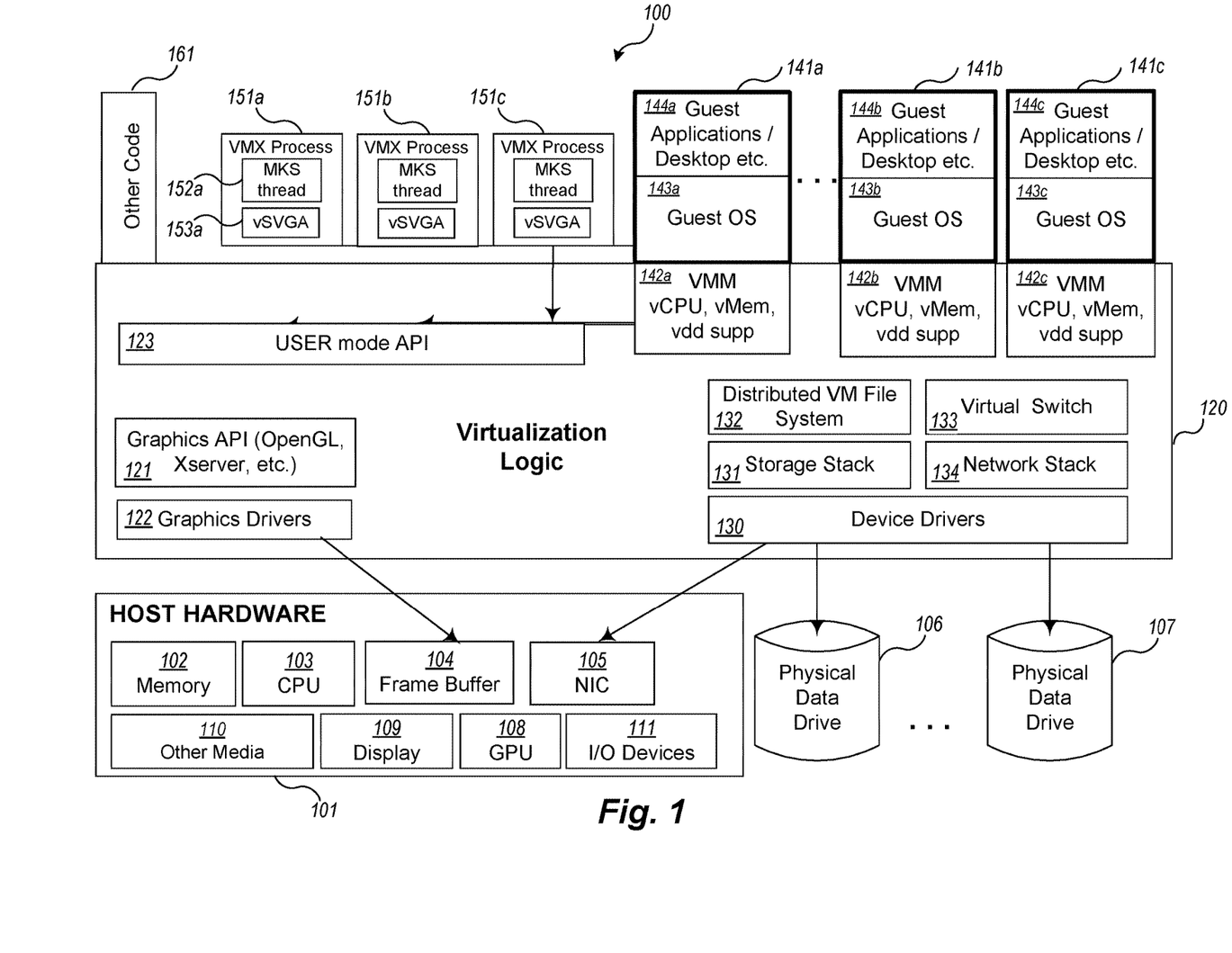
FIG. 1 is a block diagram of an example virtualization server computing system for executing example embodiments of enhanced user interface remoting.

FIG. 1 is a block diagram of an example virtualization server computing system for executing example embodiments of enhanced user interface remoting. Virtualization server computing system 100 may be configured on a personal computer, a laptop, or server (host) hardware platform 101, such as an x86 architecture platform. Note that a general purpose or a special purpose computing system suitably instructed may be used to implement the virtualization server computing system 100. The virtualization server computing system 100 may comprise one or more server computing systems and may span distributed locations. In addition, each block shown may represent one or more such blocks as appropriate to a specific embodiment or may be combined with other blocks.

In the embodiment illustrated, host hardware platform 101 may comprise a computer memory 102, one or more central processing units ("CPU") 103, a frame buffer ("FB") 104, and one or more network connections, accessible for example via network interface card ("NIC") 105. In addition, the host hardware platform 101 may optionally comprise other components such as one or more displays 109, graphics processing units ("GPU") 108, input/output ("I/O") devices 111 (e.g., keyboard, mouse, CRT or LCD display, etc.), or other computer readable media 110.

Virtualization logic 120 is loaded into memory 102 of host hardware platform 101 and may execute on one or more CPUs 103. Virtualization logic 120 may alternatively be implemented in software, hardware, or firmware, or some combination thereof. Virtualization logic 120, includes one or more virtual machine monitors (VMM) 142a-142c and VMX processes 151a-151c, which can support multiple virtual machines (VM) 141a-141c, which can concurrently be instantiated and executed. As used herein a "virtual machine" or VM is an abstraction representing the execution space that a guest operating system and applications (the "guest") may execute within, such as VM 141a-141c. Each virtual machine 141a-141c may include a guest operating system (guest OS), e.g., guest OSes 143a-143c, and one or more corresponding applications, e.g., guest applications 144a-144c, running on each respective guest OSes 143a-143c. In one example embodiment, each VM, when executing, is made accessible to a different user who is remotely connected from a different client connection. The number of VMs supported by any particular host may vary, for example, based on aspects such as the hardware capabilities, virtualization logic configurations, and desired performance. Other code 161 may also execute on virtualization logic 120.

Each VM 141a-141c may require virtualization of one or more aspects implemented by the virtualization logic 120 and/or the host hardware platform 101. That is, the virtualization logic 120 may provide emulated hardware and drivers to each VM. For example, through the VMX processes 151a-151c and the VMMs 142a-142c, the virtualization logic 120 may provide one or more of a virtual CPU ("VCPU"), a virtual memory ("VMEM"), virtual device drivers ("VDD"), a virtual file system and virtual disks, virtual network capabilities, and virtual graphics capabilities, such as virtual graphics adaptors drivers and command emulation, and the like. Each virtualization environment may function as an equivalent of a standard x86 hardware architecture platform such that any operating system (e.g., Microsoft Windows®, Linux®, Solaris®86, NetWare, FreeBSD, etc.) may be installed as a guest OS (e.g., guest OS 143a-143c) to execute applications in an instantiated virtual machine. Note that in other embodiments, virtualization of other hardware architectures may be supported.

In one embodiment, the virtualization logic 120 provides virtualized storage support through a distributed VM file system 132, storage stack 131, and device drivers 130 that communicate with the physical data drives 106 and 107. In addition, the virtualization logic 120 provides virtualized network support through a virtual switch 133 and network stack 134 to communicate with NIC 105 of the host hardware platform 101. This support may be used to provide the TCP/IP connections at the virtualization logic level referred to elsewhere herein. Also, the virtualization logic 120 provides virtualized graphics support through the SVGA (or VGA) graphics adaptor implementations which use the server graphics API 121 (such as OpenGl, Xserver implementations, etc.) to communicate with graphics drivers 122 that manage and fill frame buffer 104 of the host hardware 101 using graphics commands. In certain embodiments, the graphics capabilities of the host hardware platform 101 may be accelerated through the use of one or more GPUs 108.

In some embodiments, the virtualization execution environments are provided through both a process executing at USER (less privileged mode), referred to as the VMX process (e.g., VMX processes 151a-151c) and the VMM executing in a more privileged state (e.g., VMMs 142a-142c). Each VM 141a-141c effectively executes in the process space of its respective VMX process 151a-151c (that is its memory is mapped to each respective VMX process). A VMX process, for example processes 151a-151c, may comprise an MKS (mouse, keyboard, screen) thread (e.g., thread 152a) for processing input and output from the respective VM, e.g., VMs 141a-141c. In one example UIROS, this is where the UI remoting logic and support resides and executes, as will be described in detail below. A VMX process also includes USER mode graphics level support, such as a virtual SVGA driver 153a. Each VMX process and VMM pair cooperate to provide the effective (and isolated) virtualization execution environment for each VM to run. In general operation, the virtualization logic 120 receives requests from the virtualized device drivers implemented by the VMMs and VMX processes, translates (or otherwise transfers, forwards, sends, or communicates) these requests to corresponding requests to real device drivers 130 or 122 that communicate with real devices resident in the host hardware platform 101 (such as frame buffer 104, NIC 105, etc.).

The various terms, layers, categorizations, components used to describe the virtualization server computing system 100 of FIG. 1 may be referred to differently without departing from their functionality or the spirit of this disclosure. Also, one or more of the components may not be present in any specific implementation. For example, the virtual components shown as part of virtualization logic 120 that are not included in each VMM 142a-142c (for example, one or more of components 130-134, 121-122, or the like) may be considered in other embodiments to be part of the VMMs 142a-142c. In addition, in some embodiments, no VMX process is used and the MKS thread capabilities, including the UI remoting, and virtual graphics adaptor support are integrated instead into the VMMs 142a-142c or into other parts of the virtualization logic 120. Also, in some embodiments the VMMs 142a-142c may be considered to be separate from or part of the VM 102. Embodiments of the UIROS may be practiced in other virtualized computing environments such as hosted virtual machine systems, where the virtualization logic 120 is implemented on top of an operating system executing on host hardware platform 101 instead of directly on the host hardware.

Furthermore, in some embodiments, some or all of the components of the virtualization server computing system 100 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) such as computer readable medium 110 to enable the computer-readable medium to execute or otherwise use or provide the contents to perform at least some of the described techniques.

Figure 2:
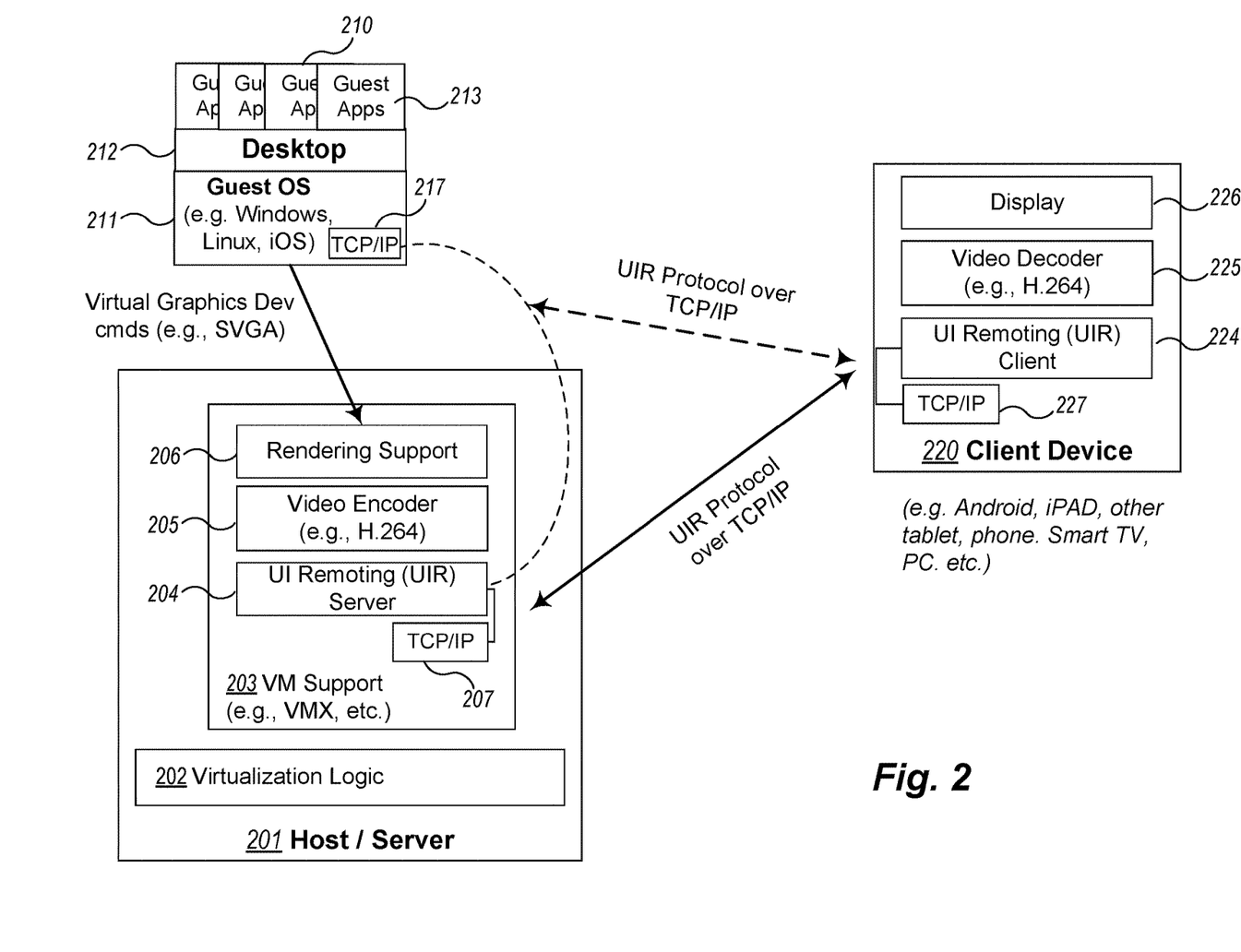
FIG. 2 is an example block diagram of components of an example User Interface Remoting and Optimization System.

FIG. 2 is an example block diagram of components of an example User Interface Remoting and Optimization System. In one embodiment, the User Interface Remoting and Optimization System (UIROS) comprises one or more functional components/modules that work together to send user interface updates to a client device using video compression and streaming techniques. These components may be implemented in software, hardware, firmware, or a combination. In FIG. 2, a UIROS comprises server side support that resides on one or more host or server computing systems 201 and client side support that resides on one or more client devices 220.

In an example embodiment, the server side support includes a UI remoting server 204, a video encoder 205, and rendering support 206. In some embodiments, these components execute as part of the VM Support 203, for example, as part of a process (e.g., the VMX process in VMware's virtualization environment) that executes on virtualization logic 202, which is hosted by host/server computing system 201. For example, these components 204-206 may execute as part of an MKS (mouse, keyboard, screen handling) thread 152a, which executes as part of VMX processes 151a-151c as described with reference to FIG. 1. In other embodiments, these components may be implemented in other parts of the virtualization environment such as part of each VMM (virtual machine monitor, e.g., VMMs 142a-142c) or as other parts of virtualization logic 202. The rendering support 206 is responsible for receiving the virtual graphics device commands from guest 210 (guest applications 213 executed from the desktop 212 using the guest operating system 211) and carrying them out through the graphics stack (shown in FIG. 1 as graphics API 121 and graphics drivers 122) to the graphics hardware associated with the host 201, such as frame buffer 104. The video encoder 205 is responsible for encoding the user interface updates as will be described in detail further herein, when invoked by the user interface remoting (UIR) server 204. The UIR server 204 can transmit user interface updates to a connected client device 220 through a TCP/IP connection 207 in the VM support 203 (virtualization logic 202, or host 201) or through a TCP/IP connection 217 in the guest operating system (guest OS) 211 for some client device interfaces that may be optimized to receive UI remoting from the guest OS 211 instead of from the virtualization support 201, 202, or 203.

The client device 220 receives the UI display updates through its TCP/IP connection 227 and user interface remoting (UIR) client 224. The UI display updates may be initially received through web browser code connected through the TCP/IP connection, which passes the information (e.g., redirects, forwards, communicates, or sends it) to the UIR client 224 and/or the video decoder 225. For example, in some embodiments, the UI display updates are handled by the web browser code's implementation of a <video> tag, for example, as available under the HTML 5 standard, to send the updates to the video decoder 225. In other embodiments, for example those that use an intermediary, such as UIR client 224, the web browser code may pass the video bitstream to the UIR client 224. The UIR client 224 may be implemented, for example, as Javascript downloaded to the client device upon connection to the VM (or at other times), to meter how the video is processed as opposed to using whatever implementation the browser code supports for the <video> tag. The video decoder 225 is then invoked (e.g., by the web browser code or by the UIR client 224) to reconstruct the bitstream (e.g., from a previous cached frame on a move, scroll, expose region, or similar operation) and sends (e.g., forwards, transmits, communicates, etc.) the data stream to be rendered on display 226.

In example embodiments, the components of the server side support and client side support of a UIROS are implemented using standard programming techniques. In general, a range of programming languages known in the art may be employed for implementing such example embodiments, including using object-oriented, functional, scripting, and declarative languages. In addition, in other embodiments the functionality of the different components may be distributed amongst themselves in different ways or distributed in other ways, yet still achieve the functions of a UIROS.

Figure 3:
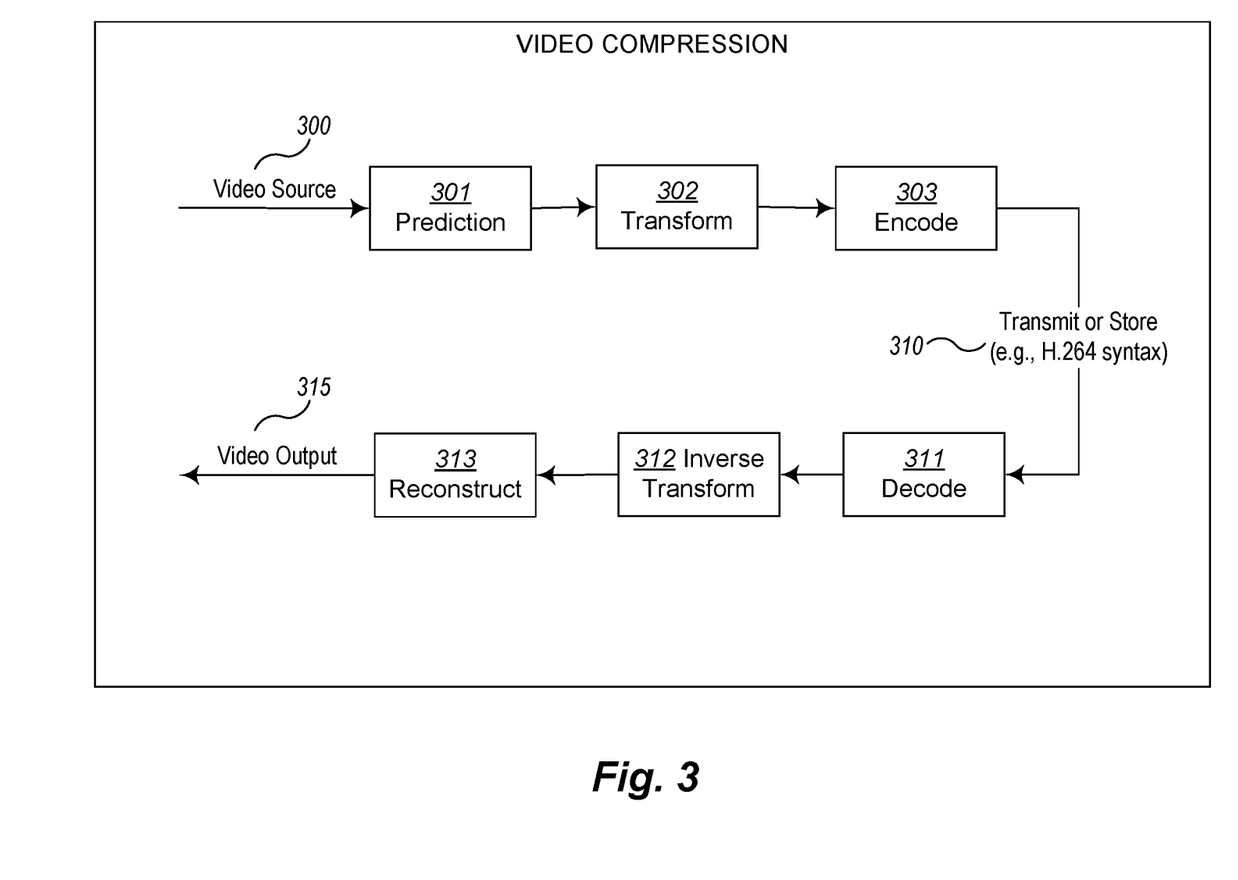
FIG. 3 is a block diagram of an overview of example video streaming using an example generic video streaming protocol.

As mentioned, in some embodiments, the UIR server 204, UIR client 224, video encoder 205, and video decoder 225 utilize video streaming and compression techniques defined by the H.264 standard, although other streaming and compression techniques may be substituted. FIG. 3 is a block diagram of an overview of example video streaming using an example generic video streaming protocol. In this example, a video source 300 is encoded and transmitted to generate video output 315 using techniques that minimize updates based upon recognizing that previous data can be used to generate a current frame. In particular, the video source 300 is examined by prediction logic 301 (e.g., code, component, block, program, task, etc.) using a process known as motion estimation to determine to which other data the current block to be rendered corresponds. In some embodiments, other data in the current frame is used to predict the data in the current block ("intraframe" prediction). In other embodiments, data from a block in a prior transmitted frame is used to predict the data in the current block ("interframe" prediction). For video, a variety of motion estimation algorithms may be used including exhaustive searching. When using the H.264 standard, blocks of different sizes may be used, including 16×16 pixel blocks down to 4×4 pixel blocks. Once the prediction block is selected, and it is determined how the block is to be relocated to result in the current (desired) block to be rendered, the data is transformed by transform component 302 (e.g., module, logic, block, code, program, task, etc.) according to techniques of the streaming and compression protocol and then encoded (and typically compressed) into a bitstream by encode component 303. The encoded bitstream is then transmitted or stored 310 in an appropriate syntax to be delivered to a target (e.g., client) device based upon the video format. When received on the client device, the encoded (and typically compressed) bitstream is then decoded by decode component 311 and then an inverse transform is conducted on the information in the bitstream using transform component 312 to resurrect information for building the block to be rendered. The transform data along with other data from the bitstream (for example, a pointer, reference, etc. to a prediction block) is then used by the reconstruct component 313 to produce video output 315 for rendering.

Figure 4:
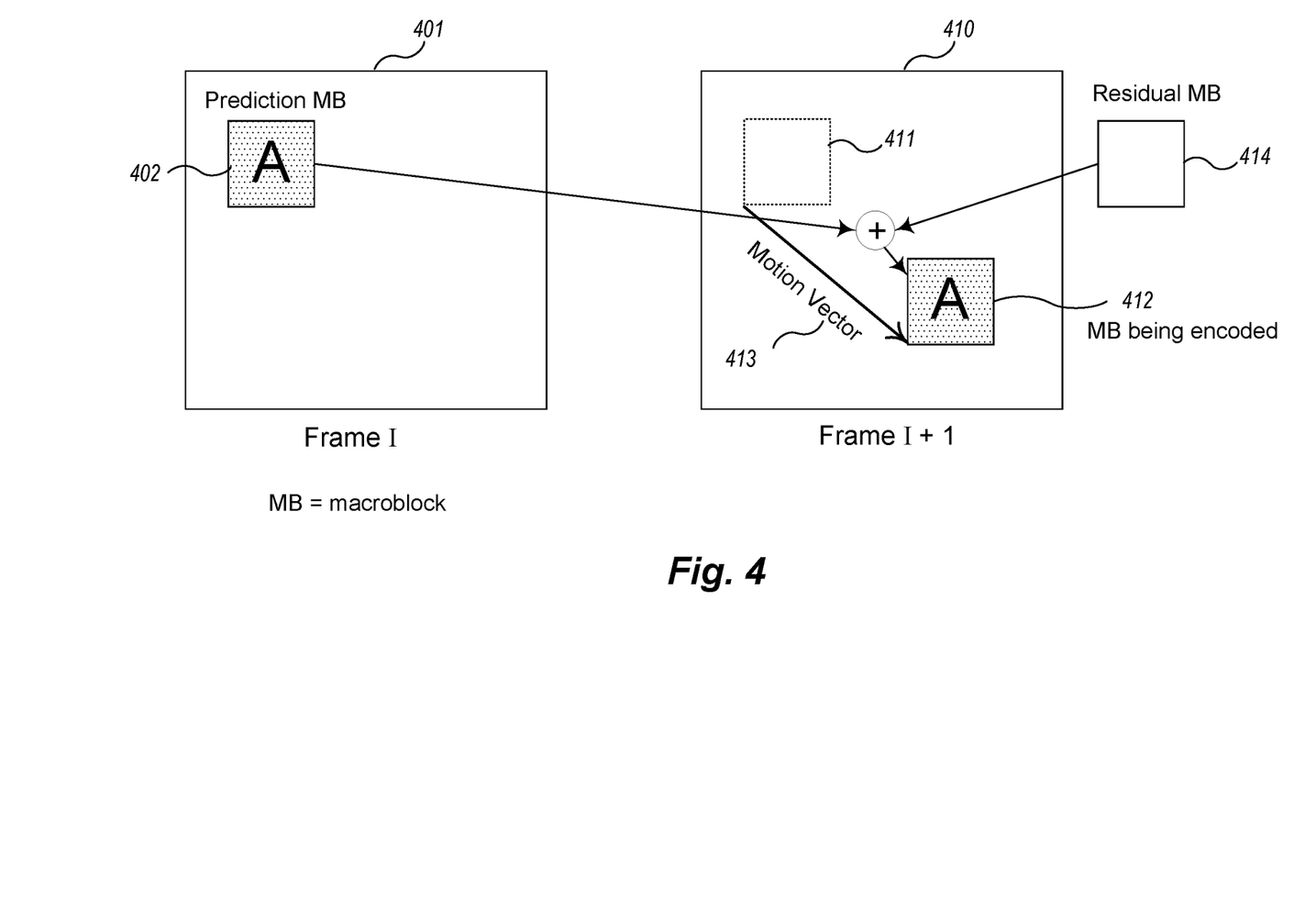
FIG. 4 depicts an overview of an example video encoding technique performed according to the H.264 video streaming protocol.

When using the H.264 standard, the UIROS determines a prediction block (called a "prediction macroblock") and calculates a motion vector encoding how that block is to be moved to efficiently represent many user interface activities addressed in UI remoting. FIG. 4 depicts an overview of an example video encoding technique performed according to the H.264 video streaming protocol. The example depicted utilizes interframe prediction (using a previously encoded and transmitted frame) to perform encoding. That is, a prior frame I 401 is used to find a macroblock 402 that is similar to a macroblock 412 in the current frame I+1 410 to be encoded and transmitted. Prediction macroblock 402 in a past transmitted frame 401 is depicted as containing the exact same pixel data that is to be presented in the macroblock 412 which is being encoded. The motion vector 413 in the current frame 410 being encoded captures the movement of that macroblock from its prior position (411) to its destination position (412). According to the H.264 standard, a residual macroblock 414 is computed that contains differences between the prediction macroblock 402 and the target macroblock 412 being encoded. Due to the nature of UI encoding (bit-blit operations), the residual macroblock 414 is typically null/empty because the information is not changed, just moved. The H.264 standard specifies how the prediction macroblock 402 is encoded, along with motion vector 413, so that the decoder can reuse an already received block of cached pixel data (411), move it to the position indicated by motion vector 413, and apply any information contained in the residual macroblock 414 to render the resultant macroblock 412. The H.264 standard specifies how all of this information is encoded into a compressed bitstream that is compact and efficient. More information on the H.264 standard is described in Iain Richardson, *White Paper: A Technical Introduction to H.264/AVC*, VCcodex, 2002-2011, and in Iain Richardson, *White Paper: An overview of H.264 Advanced Video Coding*, Vcodex/OnceCodec, 2007-2011 incorporated herein by reference in their entireties.

When used with UI remoting, the UIR server (e.g., UIR server 204 of FIG. 2), incorporates knowledge of user interface activities to perform motion estimation—to determine an appropriate prediction macroblock for each block being encoded and transmitted to the client device. For example, when a user scrolls a document or moves something on the desktop, for example a window, the UIR server can compute what pixels remain the same and what is the new content (additional pixels) for the client device to render. Using H.264 (or any other similar video encoding) the UIR server can send the client device indications of predictive macroblocks and their motion vectors to correspond to the portions of the user interface that are still to be rendered but in a different location. The UIR server then only needs to encode as new data the pixels that are now to appear on the display screen (be rendered by the client device).

Figure 5:
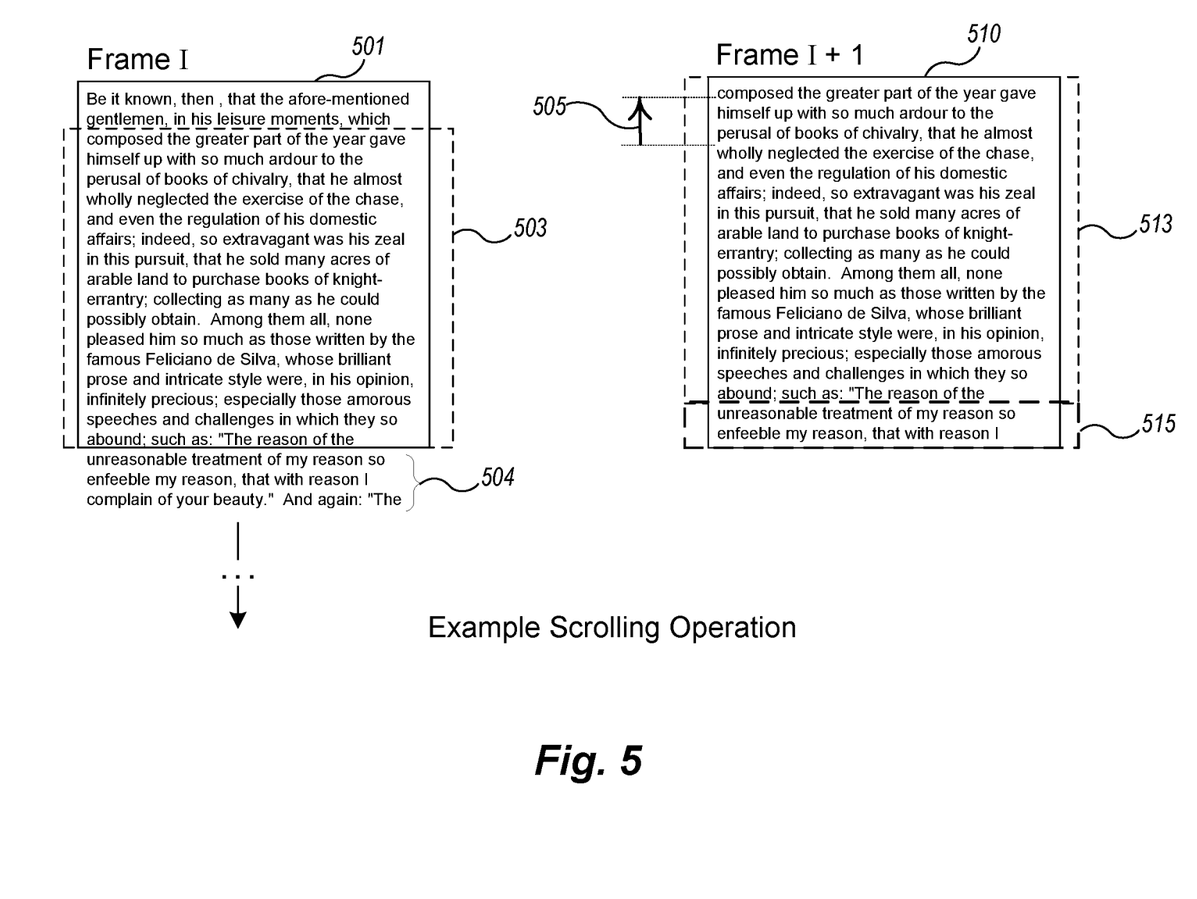
FIG. 5 depicts an example of pixel movement according to an example operation of a user interface.

FIG. 5 depicts an example of pixel movement according to an example operation of a user interface. In this case, the example operation is a scrolling operation. This example depicts a document in Frame I 501 being manipulated on a virtualization server. The content of the document presently being displayed (before the user interface operation) is shown in Frame I 501. These are the pixels that have already been remoted to a client device. The content that is available in the text to be displayed, but not yet displayed, is shown as text 504. When a user performs a scroll down operation (the text scrolls up), the content with dotted box 503 in Frame I 501 is already cached on the client device and therefore can be encoded as prediction macroblocks and motion vectors 505 that will reflect the content (indicated as within dotted frame 513) in a new position in Frame I+1 510. The new content is shown within dotted box 515. The pixels in box 515 are the pixels that need to be encoded and transmitted to the client device to complete rendering of the scrolling operation. Thus, when the UIR server uses video encoding to encode the outcome of the scroll operation, the UIR server will use prediction macroblocks from Frame I 501 and motion vector 505 to communicate to the client to reuse the pixel data shown in dotted box 513 moved to a new position and to render new (encoded and transmitted) content 515.

Although the examples described herein often refer to remoting a user interface desktop and such actions as scrolling, moving, grabbing, pinching, and exposing regions or pixels, the techniques described herein can also be used to render any type of display presentation. In addition, the concepts and techniques described are applicable to other video encoding techniques, including other types of video encoding technologies and browsers that support the same. Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement a User Interface Remoting and Optimization System to be used to remote UIs using video encoding technology. In the following description, numerous specific details are set forth, such as data formats and code logic sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like. For example, given the time criticality of the actions involved in UI remoting, the decomposition into multiple sequences as depicted in FIGS. 6-9 may not likely to be reflected in a live implementation, but is so depicted for ease of description.

Figure 6:
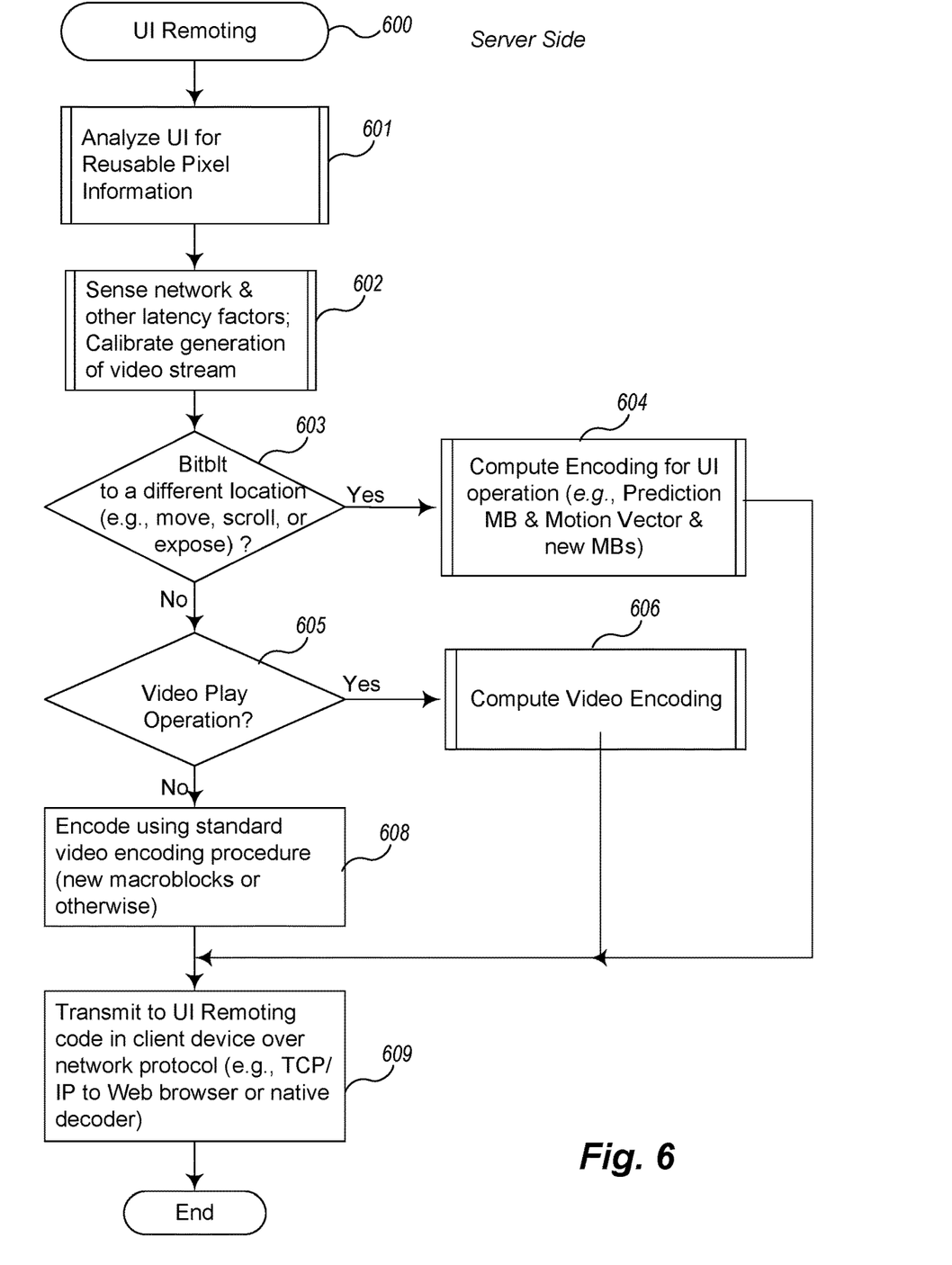
FIG. 6 is a flow diagram of example server logic for enhanced user interface remoting according to an example embodiment.

FIG. 6 is a flow diagram of example server logic for enhanced user interface remoting according to an example embodiment. Logic 600 may be executed, for example, within MKS thread 152*a* of the UIR server 204 in FIG. 2 of virtualization logic 120 in FIG. 1. This logic illustrates the overall flow for remoting a UI (such as a user desktop) to a client device.

Figure 7:
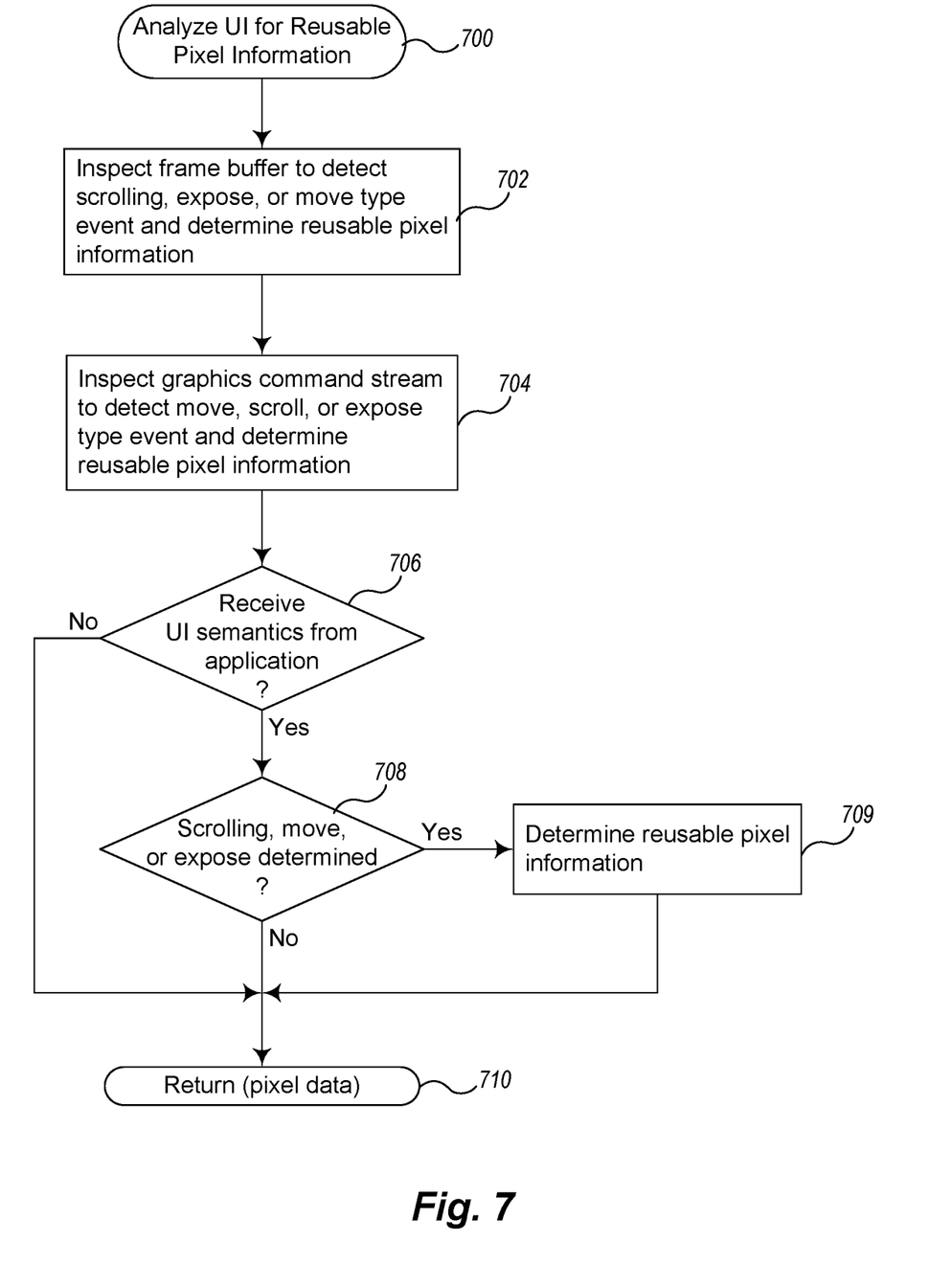
FIG. 7 is a flow diagram of example logic for analyzing a user interface for determining reusable pixel data according to an example embodiment.

In block 601, the logic analyzes the user interface subject to remoting for reusable pixel information in the portion of the user interface that has changed. This analysis is described in detail with respect to FIG. 7. In overview, the UIR server determines whether the UI command is one that results in a bit-blit operation (a block transfer of pixel data) of already transferred pixel data to a possibly modified location. If so, then the operation is likely one that can be represented by an optimized P-frame using the video encoding techniques described. If not, then the operation may encode the changed regions by sending one or more macroblocks with new pixel data. The reusable pixel techniques described with respect to FIG. 7 are performed relative to the portion of the UI that has changed (the "dirty" region or changed portion of the display). The portions of the UI that have not changed may be encoded using video encoding techniques by reusing macroblocks from prior frames, or in some embodiments, by indicating unchanged regions in the video stream (e.g., by using a construct that indicates what macroblocks can be skipped over).

In block 602, the logic calibrates generation of the video stream to be produced. The UIR server tries to generate frames to send to the client device just at the right frequency and point in time so that they make it to the client device in a timely manner and are not "stale" in the pipe in the case of overloaded network queues. To do this, the UIR server logic calibrates generation of the video stream (before and potentially) while it is being delivered to the client device. Calibration may occur, for example, as a result of obtaining feedback information from a client device (over, for example, a backchannel) regarding network conditions and client load. Feedback may include network latency and bandwidth information as well as client overload conditions. The UIR server may use this information along with other information about the client device, such as the device type, model, etc. to calibrate its synthetic and real time generation of the video stream. When the UIR server determines that the network is overloaded (e.g., the transmit buffer is getting overloaded), the UIR server may compress harder (e.g., more compression of the encodings) or slow down the generation of the video frames. In some embodiments, depending upon the encoding/decoding, when bandwidth is limited, the UIR may utilize residual frames to deliver progressive enhancements that the client may render accumulatively, thus leveraging the additive construct of residual frames. When, on the other hand, the UIR server determines that the client device (not the network) is overloaded, the UIR server may transmit fewer frames. Similarly, when the UIR server determines that there is abundant bandwidth to deliver data to the client device, the UIR server may compress lighter to reduce the CPU processing on the host server needed to provide compression of pixel data. Other calibrations may be similarly incorporated. The logic of block 601 may be performed at a variety of times, but is typically performed prior to transmitting the video encoding to the client device in block 609.

In block 603, if the analysis of block 601 returned an indication that such a bit-blit operation of previously transferred data is occurring (e.g., due to a move, scroll, expose, or other UI operation), then the logic continues in block 604, otherwise the logic continues in block 605.

In block 604, the logic computes the encoding according to the video encoding protocol, for example, H.264 described above and continues in block 609. An example of the computation of the video encoding is described further in FIG. 8 and accounts for reusable pixel information as well as the data that needs to be sent anew.

In block 605, when the analysis of block 601 returned an indication that an operation related to previously transferred data is not occurring, then the logic determines whether an operation to play video has been indicated. If so the, logic continues in block 606, otherwise continues in block 608.

In block 606, the logic computes an encoding for remoting the indicated video playback, and then continues in block 609. This operation may occur, for example, when a user is using a video on demand application such as YouTube or a video conferencing application like Skype. In this case, the logic attempts to leverage the source video stream in constructing the remoted video stream. Such an approach is significantly more CPU efficient than decoding the video stream into pixels, only to re-encode it onto another video stream as part of the UI. If for some reason the client device is not capable of decoding the original video stream, or the available bandwidth to the client device is insufficient to receive the source video stream (or for other reasons), then the logic transcodes the source stream into a proper form to remote. In some embodiments, the motion vector information and macroblocks from the original video stream can be reused at least in part to speed up the transcoding process so that at least a portion of the original video encoding can be leveraged. For example, the coordinate system for the area of the UI reserved for the video stream may be different from the coordinate system used for the UI remoting as a whole; however the calculations of the new motion vectors may still be informed by the calculations of the motion vectors of the video stream.

In block 608, if the logic has determined that some other UI operation has occurred that requires remoting but for which no motion estimation algorithm is used or is not effective, then the logic continues to encode pixel data using standard procedures, for example, using macroblocks with new data when data has changed, or to reuse macroblocks from prior frames or to skip macroblocks when data is unchanged, as appropriate, and continues in block 609.

In block 609, the logic transmits the encoded data (in an encoded bitstream as dictated by the video protocol employed) to the UI remoting code (e.g., UIR client 224 in client device 220 in FIG. 2). In some embodiments, this is accomplished using a network connection (e.g., TCP/IP connection 207 in the virtualization logic or host) to the web browser (not shown) running on the client device, which has previously established an authenticated connection to the server's TCP/IP connection. The web browser can act as a thin veneer and passes the video stream straight to the video decoder (often hardware assisted), for example, video decoder 225, which then renders the data on the display of the client device. In some embodiments, code is downloaded to the client device, for example, as Javascript, to meter the feeding of the video stream to the <video> tag processing by the browser so as to control the speed of processing of the video stream. In other embodiments, the TCP/IP connection to the web browser operates through the guest OS, such as TCP/IP connection 217 in guest OS 211. In still other embodiments, the encoded data is sent over TCP/IP directly to a driver (not shown) for the video decoder native to the client device. Other embodiments may employ other networking protocols other than TCP/IP. FIG. 2 depicts these different connections as "UIR protocol."

FIG. 7 is a flow diagram of example logic for analyzing a user interface for determining reusable pixel data. Logic 700 may be executed, for example, within MKS thread 152 of the UIR server 204 in FIG. 2 of virtualization logic 120 shown in FIG. 1. Logic 700 may be invoked, for example, from block 601 in FIG. 6. This logic determines whether the next changed region to be encoded may be optimized to reuse existing macroblock information, taking advantage of UI frame coherence, or needs to be sent as a key frame (a new frame), for example, when the user opens a screen wide application. One or more of the techniques used in this logic sequence may be implemented in any embodiment. For example, in the embodiment shown, each technique is examined to determine reusability (in a series). In other techniques, one or more techniques are examined in the alternative. In one example embodiment, a generic video encoder is modified to implement one or more of these techniques in its motion estimation portion of its logic.

In block 702, the logic inspects a frame buffer to detect whether a scrolling or move type event has occurred (looking for a scrolling or move "fingerprint") and to determine the reusable pixel information therefrom. In some embodiments this is done by detecting a bit-blit by comparing the frame buffer content to a previous frame buffer content upon receiving mouse movement, arrow keys, scroll dial events, and other user input that would indicate a "move" of previously visible pixels. If a bit-blit has been detected, appropriate prediction macroblocks and their corresponding motion vectors are generated. Here, the frame buffer is typically the virtual frame buffer utilized by the VM that corresponds to the executing application. Other constructs such as "blitmap" structures (not shown), such as those implemented by a virtual video adapter driver, may be used to support determining whether there are regions in the frame buffer that have changed during some time interval or as a result of certain operations. (A description of the creation and (other) use of a blitmap structure is provided in Byford et al., US 2010/0271379, entitled "Method and System for Copying a Framebuffer for Transmission to a Remote Display," published on Oct. 28, 2010.) Also, in some systems, a prior state of the frame buffer (in part or in whole) may be cached for comparison to determine reusable pixel information. The logic then continues in block 704 to determine additional possible optimizations keeping track of the ones it has already generated.

In block 704, the logic inspects the guest's graphics command stream to detect move, scroll, expose or other type of relevant UI events (by, for example, pattern matching particular commands). If so, appropriate prediction macroblocks and their corresponding motion vectors are generated, for example, using information from the previously encoded frames maintained by, for example, the video encoder 205 of FIG. 2. The logic then continues in block 706 to determine additional possible optimizations keeping track of the ones it has already generated.

In block 706, the logic determines whether it has received notification (through, for example, an API) of any UI semantics that reuse pixel information. In some embodiments, the logic supports an API that enables applications to take advantage of UI coherence information and knowledge that its UI may be remoted, for example, in a virtualization environment. An application having awareness of UI remoting may opportunistically cache pixel information, for example, a next new block of content of scroll pixels, or a next photo in a slide show, before it is to be rendered on a display screen. For example, applications (or other components that aid in UI remoting) may leverage H.264 decoder frame caching to pre-load pixel information to provide a type of "lookahead" to decrease UI latency on the client device.

If the logic determines it has received notification of UI semantics, then the logic continues in block 708 otherwise, continues to block 710. In block 708, the logic determines whether the received notification pertains to one of these commands and if so continues in block 709, otherwise continues to block 710. In block 709, the logic generates appropriate reusable pixel and/or other information as described below, and then continues to block 710.

In block 710, the logic returns the generated pixel information including the prediction macroblocks and their corresponding motion vectors. If no optimizations are possible, then new pixel information (one or more macroblocks) are returned.

Figure 8:
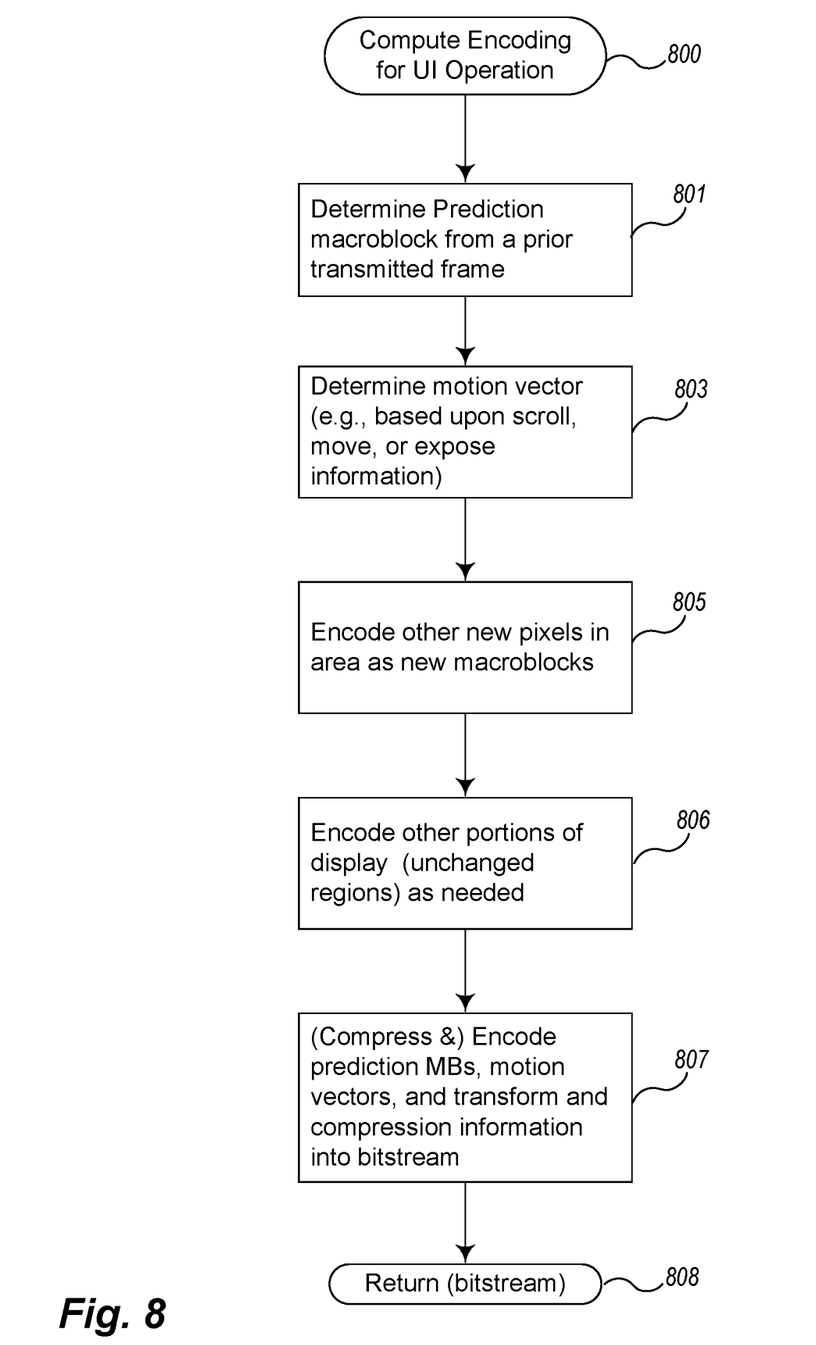
FIG. 8 is a flow diagram of example logic for determining and generating an encoding of user interface data using a video streaming protocol according to an example embodiment.

FIG. 8 is a flow diagram of example logic for determining and generating an encoding of user interface data using a video streaming protocol according to an example embodiment. Logic 800 may be executed, for example, within MKS thread 152 of the UIR server 204 in FIG. 2 of virtualization logic 120. Logic 800 may be invoked, for example, from block 604 in FIG. 6 when at least some pixel reusability is possible. This logic determines the encodings according to the process described with respect to FIG. 3 and is specific to the video encoding protocol employed.

In block 801, the logic determines one or more prediction macroblocks from a prior transmitted frame that may be reused, as indicated from the analysis of the logic of FIG. 7 and as described in FIG. 4. This is done for whatever portions of the display are being remoted since, in some examples, the entire display screen may or may not be remoted. The results of the motion estimation of FIG. 7 will indicate what rectangles are reusable. For example, when a document is being scrolled, there are some portions of the changed regions of the display (e.g., macroblocks) that are determined to be reusable, and other portions of the changed regions that must be sent as new data (e.g., new macroblocks).

In block 803, the logic determines the one or more corresponding motion vectors applicable to the prediction macroblocks, as indicated from the analysis of the logic of FIG. 7 and as described in FIG. 4.

In block 805, the logic encodes the remaining rectangles of the changed regions as new macroblocks, since no reusability has been determined for this pixel information.

In block 806, the logic encodes the unchanged regions of the portion of the display being remoted. As described above, this may be performed by referencing existing macroblocks previously transmitted, by indicating which macroblocks may be "skipped," or by other mechanisms.

In block 807, the logic compresses and encodes the one or more prediction macroblocks, their corresponding motion vectors, and the remaining macroblocks and information and transforms and compresses this information into a bitstream according to the requirements of the video encoding protocol. The encoded bitstream is returned at block 808.

Figure 9:
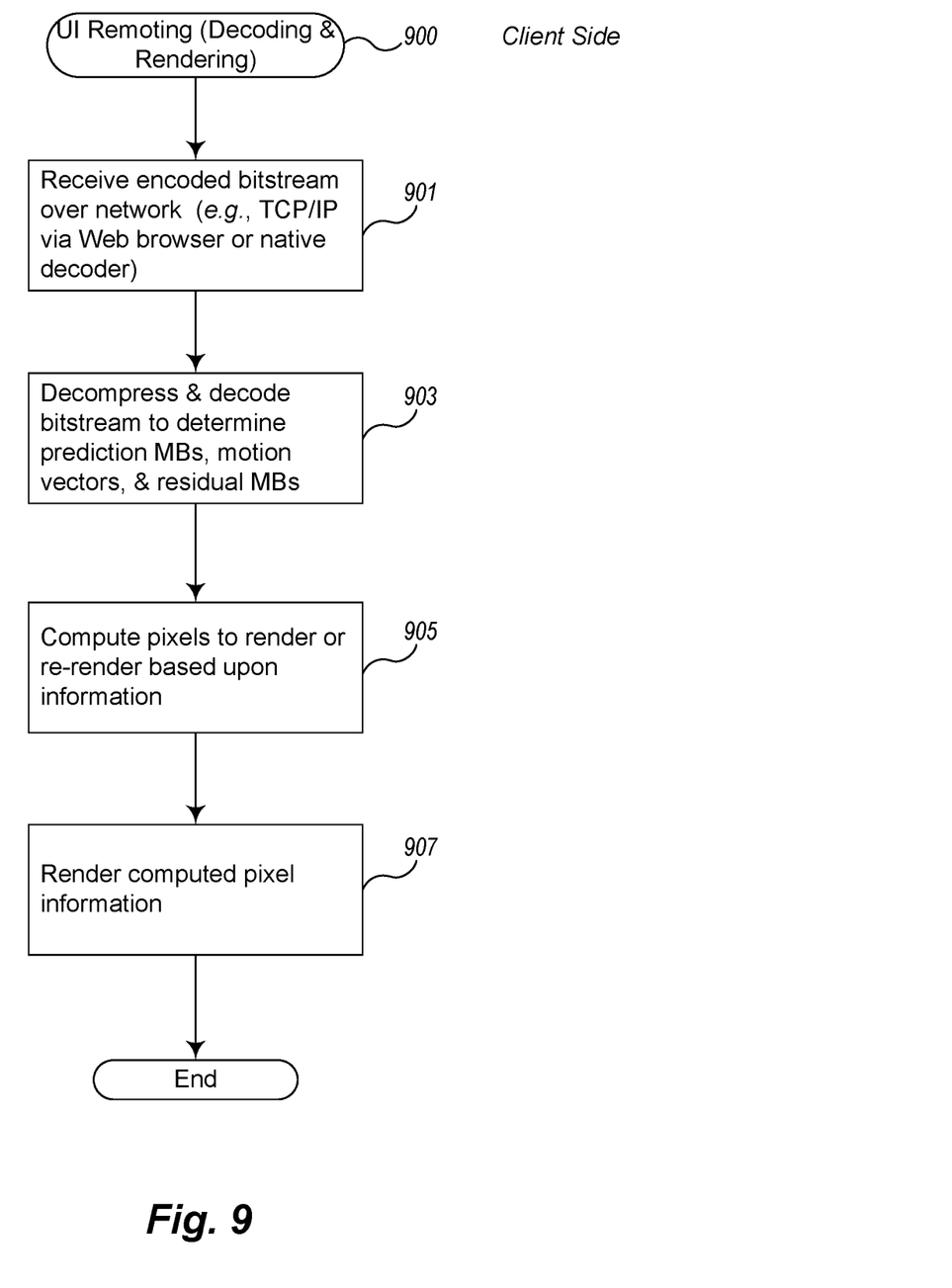
FIG. 9 is a flow diagram of example client logic for decoding and rendering a received video bitstream according to an example embodiment.

FIG. 9 is a flow diagram of example client logic for decoding and rendering a received video bitstream according to an example embodiment. Logic 900 may be executed, for example, by the video decoder 225 in FIG. 2 executing, for example, within the client device 220. Logic 900 receives and processes the encoded bitstream that results from FIGS. 6 and 8 according to the process described with reference to FIG. 3.

In block 901, the logic receives an encoded bitstream (e.g., from the UIR client 224 via a web browser over a TCP/IP connection).

In block 903, the logic decompresses and decodes the bitstream according to the video stream protocol to determine the one or more prediction macroblocks and their associated motion vectors and residual macroblocks. This may include performing an inverse transform to recreate the residual macroblock information.

In block 904, the logic computes the pixels to render by locating the cached pixel information based upon the indicated prediction macroblocks, moves the pixels according to their respective motion vectors, and adds any difference information encoded in the residual macroblock information. Note that in the typical case, bit-blits do not result in changed information so that the residual macroblock information is non-existent (or zero). In some embodiments, for example those in which bandwidth is scarce, the residual macroblocks are used for progressive refinements. In some cases, I-Frames (key frames) are encoded, compressed, and transmitted, and thereby rendered as is.

In block 907 the computed pixel information is rendered on a display device associated with the client device.

The logic then ends.

All of the above U.S. patents, U.S. patent application publications, U.S. patent applications, foreign patents, foreign patent applications and non-patent publications referred to in this specification and/or listed in the Application Data Sheet, are incorporated herein by reference, in its entirety.

From the foregoing it will be appreciated that, although specific embodiments have been described herein for purposes of illustration, various modifications may be made without deviating from the spirit and scope of the present disclosure. For example, the methods, techniques, and systems for performing video encoding for UI remoting discussed herein are applicable to other architectures other than an x86 architecture. Also, the methods and systems discussed herein are applicable to differing protocols, communication media (optical, wireless, cable, etc.) and devices (such as wireless handsets, electronic organizers, personal digital assistants, portable email machines, tablets, notebooks, game machines, pagers, navigation devices such as GPS receivers, etc.).

The invention claimed is:

1. A method for remoting a user interface from a server device to a client device over a network, the method comprising:
   detecting an update to a user interface of a virtual desktop running on a virtual machine operating on a server device, wherein the user interface of the virtual desktop is remoted over the network to the client device;
   performing pattern matching on one or more graphics commands sent from a guest operating system of the virtual machine to virtualization logic on the server device to detect a move, scroll, or uncover region event in the user interface of the virtual desktop;
   in response to detecting the move, scroll or uncover region event, determining a set of pixels that can be reused to update the user interface on the client device, wherein determining the set of pixels is performed prior to transmitting the set of pixels to the client device;
   computing a motion vector for the set of pixels resulting from the move, scroll or uncover region event;
   transmitting the motion vector to the client device, wherein the client device receives the motion vector and uses the motion vector to update the user interface based on a previously cached frame.

2. The method of claim 1, further comprising:
   encoding the motion vector using a video encoding protocol.

3. The method of claim 2, wherein the video encoding protocol is at least one of an H.264 protocol, H.265 protocol, VC1 protocol, or an VP8 protocol.

4. The method of claim 2, wherein transmitting the motion vector to the client device further comprises sending the motion vector to a web browser executing on the client device in a manner that causes the web browser to forward the motion vector to a decoder for the video encoding protocol.

5. The method of claim 1, wherein the server device further includes a video encoder that is configured to receive a notification from a guest application on a guest operating system through an application programming interface (API), the notification indicating that the guest application has opportunistically pre-loaded pixel information on the client device using video decoder frame caching.

6. The method of claim 1, further comprising:
detecting that a transmit buffer has exceeded a predetermined load; and
adjusting compression of encoded video-based representations or adjusting a rate of generating and sending of encoded video-based representations from the server device to the client device.

7. A server computing device, comprising:
at least one processor; and
memory including instructions that, when executed by the at least one processor, cause the server computing device to:
detect an update to a user interface of a virtual desktop running on a virtual machine operating on the server computing device, wherein the user interface of the virtual desktop is remoted over the network to a client device;
perform pattern matching on one or more graphics commands sent from a guest operating system of the virtual machine to virtualization logic on the server device to detect a move, scroll, or uncover region event in the user interface of the virtual desktop;
in response to detecting the move, scroll or uncover region event, determine a set of pixels that can be reused to update the user interface on the client device, wherein determining the set of pixels is performed prior to transmitting the set of pixels to the client device;
compute a motion vector for the set of pixels resulting from the move, scroll or uncover region event;
transmit the motion vector to the client device, wherein the client device receives the motion vector and uses the motion vector to update the user interface based on a previously cached frame.

8. The server computing device of claim 7, further comprising instructions that, when executed by the at least one processor, cause the server computing device to:
encode the motion vector using a video encoding protocol.

9. The server computing device of claim 8, wherein the video encoding protocol is at least one of an H.264 protocol, H.265 protocol, VC1 protocol, or an VP8 protocol.

10. The server computing device of claim 8, wherein transmitting the motion vector to the client device further comprises sending the motion vector to a web browser executing on the client device in a manner that causes the web browser to forward the motion vector to a decoder for the video encoding protocol.

11. The server computing device of claim 7, further comprising a video encoder that is configured to receive a notification from a guest application on a guest operating system through an application programming interface (API), the notification indicating that the guest application has opportunistically pre-loaded pixel information on the client device using video decoder frame caching.

12. The server computing device of claim 7, further comprising instructions that, when executed by the at least one processor, cause the server computing device to:
detect that a transmit buffer has exceeded a predetermined load; and
adjust compression of encoded video-based representations or adjusting a rate of generating and sending of encoded video-based representations from the server device to the client device.

13. A non-transitory computer readable storage medium comprising one or more sequences of instructions, the instructions when executed by one or more processors causing the one or more processors to execute the operations of:
detecting an update to a user interface of a virtual desktop running on a virtual machine operating on a server device, wherein the user interface of the virtual desktop is remoted over the network to a client device;
performing pattern matching on one or more graphics commands sent from a guest operating system of the virtual machine to virtualization logic on the server device to detect a move, scroll, or uncover region event in the user interface of the virtual desktop;
in response to detecting the move, scroll or uncover region event, determining a set of pixels that can be reused to update the user interface on the client device, wherein determining the set of pixels is performed prior to transmitting the set of pixels to the client device;
computing a motion vector for the set of pixels resulting from the move, scroll or uncover region event;
transmitting the motion vector to the client device, wherein the client device receives the motion vector and uses the motion vector to update the user interface based on a previously cached frame.

14. The non-transitory computer readable storage medium of claim 13, further comprising instructions for:
encoding the motion vector using a video encoding protocol.

15. The non-transitory computer readable storage medium of claim 14, wherein the video encoding protocol is at least one of an H.264 protocol, H.265 protocol, VC1 protocol, or an VP8 protocol.

16. The non-transitory computer readable storage medium of claim 14, wherein transmitting the motion vector to the client device further comprises sending the motion vector to a web browser executing on the client device in a manner that causes the web browser to forward the motion vector to a decoder for the video encoding protocol.

17. The non-transitory computer readable storage medium of claim 13, wherein the server device further includes a video encoder that is configured to receive a notification from a guest application on a guest operating system through an application programming interface (API), the notification indicating that the guest application has opportunistically pre-loaded pixel information on the client device using video decoder frame caching.

18. The method of claim 1, further comprising:
detecting a bit-blit operation in a virtual frame buffer of the virtual machine, wherein the bit-blit operation is detected by comparing frame buffer content of the virtual frame buffer to a previous frame buffer content upon receiving mouse movement, arrow keys, scroll dial events or other user input that indicates a move of previously visible pixels.

19. The server computing device of claim 7, further comprising instructions that, when executed by the at least one processor, cause the server computing device to:
- detect a bit-blit operation in a virtual frame buffer of the virtual machine, wherein the bit-blit operation is detected by comparing frame buffer content of the virtual frame buffer to a previous frame buffer content upon receiving mouse movement, arrow keys, scroll dial events or other user input that indicates a move of previously visible pixels.

20. The non-transitory computer readable storage medium of claim 13, further comprising instructions for:
- detecting a bit-blit operation in a virtual frame buffer of the virtual machine, wherein the bit-blit operation is detected by comparing frame buffer content of the virtual frame buffer to a previous frame buffer content upon receiving mouse movement, arrow keys, scroll dial events or other user input that indicates a move of previously visible pixels.

* * * * *